United States Patent

Harris

[15] 3,665,005
[45] May 23, 1972

[54] PROCESS FOR PREPARING 4-HYDROXY-6,7-SUBSTITUTED-3-CARBOALKOXYQUINOLINES

[72] Inventor: Nicholas D. Harris, Norwich, N.Y.
[73] Assignee: Morton-Norwich Products, Inc.
[22] Filed: Dec. 22, 1969
[21] Appl. No.: 887,386

[52] U.S. Cl. ..................................................260/287 R
[51] Int. Cl. ...................................................C07d 33/48
[58] Field of Search ....................................260/287, 629

[56] References Cited

UNITED STATES PATENTS

| | | | |
|---|---|---|---|
| 3,481,991 | 12/1969 | Cohen | 260/629 |
| 3,485,845 | 12/1969 | Davis | 260/287 |
| 3,397,208 | 8/1968 | Berman et al | 260/287 |

*Primary Examiner*—Donald G. Daus
*Attorney*—Bradford S. Allen

[57] ABSTRACT

4-Hydroxy-6,7-substituted-3-carboalkoxyquinolines, useful as coccidiostats, are readily prepared by refluxing a dimethyl sulfoxide solution of the corresponding 4-chloro compound.

1 Claim, No Drawings

PROCESS FOR PREPARING 4-HYDROXY-6,7-SUBSTITUTED-3-CARBOALKOXYQUINOLINES

This invention relates to a process for preparing 4-hydroxy-6,7-substituted-3-carboalkoxyquinolines known to be useful as coccidiostats. More particularly it is concerned with the preparation of such quinolines wherein the 6,7-substituents are each alkoxy or one of them is alkoxy and the other alkyl. Still more particularly it aims to provide a process for preparing such quinolines which comprises heating a solution of the corresponding 4-chloro compound in dimethyl sulfoxide.

There is disclosed in U.S. Pat. No. 3,397,208 and British Pat. No. 1,138,539 a process for preparing 4-chloro-6,7-substituted-3-carboalkoxyquinolines by reacting a dialkyl 3,4-substituted anilinomethylenemalonate with phosphorus oxychloride followed by acid hydrolysis to secure the corresponding 4-hydroxy compounds which are useful coccidiostats.

The instant invention provides an alternative, simple and inexpensive method for converting 4-chloro-6,7-substituted-3-carboalkoxyquinolines to the respective 4-hydroxy counterparts. In accordance with this invention the 4-chloro-6,7-substituted-3-carboalkoxyquinoline is dissolved in dimethyl sulfoxide and the resultant solution heated. Following the heating period the solution is quenched and the 4-hydroxy-6,7-substituted-3-carboalkoxyquinoline recovered.

In order that this invention may be readily available to and understood by those skilled in the art the following illustrative examples are supplied:

EXAMPLE I

Ethyl 4-chloro-6,7-diisobutoxy-3-quinolinecarboxylate (5 g.) and dimethyl sulfoxide (40 ml.) were heated on the steam bath for 2 hours. The reaction mixture was cooled to 20°C. The solid was collected, washed with dimethyl sulfoxide and dried to yield (80 percent) ethyl 4-hydroxy-6,7-diisobutoxy-3-quinolinecarboxylate (m.p. 282–284°C.).

EXAMPLE 2

Ethyl 6-decyloxy-7-ethoxy-4-chloro-3-quinolinecarboxylate (0.5 g.), mp 86–87°C., and dimethyl sulfoxide (7 ml.) were heated at 100° for 2 hours. The reaction mixture was cooled and the solid was collected, washed with n-hexane, and dried at 100° to yield 0.35 g. of ethyl 4-hydroxy-6-decyloxy-7-ethoxy-3-quinolinecarboxylate (m.p. 246–248°).

EXAMPLE 3

Methyl 6-n-butyl-7-benzyloxy-4-chloro-3-quinolinecarboxylate (0.08 g.), mp 92–95°C., and dimethyl sulfoxide (1.4 ml.) were heated at 100°C. for 2 hours. The reaction mixture was cooled, the solid was collected, washed with n-hexane and dried to yield 0.05 g. of 4-hydroxy-6-n-butyl-7-benzyloxy-3-quinolinecarboxylate (m.p. 281–283°C.).

What is claimed is:

1. A process for preparing a compound of the formula:

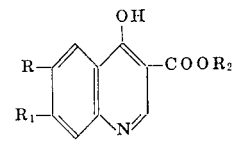

wherein R is isobutoxy, decyloxy or n-butyl; $R_1$ is isobutoxy, ethoxy or benzyloxy; and $R_2$ is methyl or ethyl which consists in heating a compound of the formula:

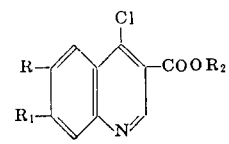

wherein R, $R_1$ and $R_2$ have the aforeassigned significance in the presence of dimethylsulfoxide.

* * * * *